United States Patent
Samuelsson et al.

(10) Patent No.: US 9,414,085 B2
(45) Date of Patent: Aug. 9, 2016

(54) SUB-BITSTREAM EXTRACTION

(71) Applicant: Telefonaktiebolaget L M Ericsson (publ), Stockholm (SE)

(72) Inventors: Jonatan Samuelsson, Stockholm (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 14/372,981

(22) PCT Filed: Nov. 29, 2012

(86) PCT No.: PCT/SE2012/051327
§ 371 (c)(1),
(2) Date: Jul. 17, 2014

(87) PCT Pub. No.: WO2013/109178
PCT Pub. Date: Jul. 25, 2013

(65) Prior Publication Data
US 2015/0131744 A1  May 14, 2015

Related U.S. Application Data (60) Provisional application No. 61/588,800, filed on Jan. 20, 2012.

(51) Int. Cl.
*H04N 19/00* (2014.01)
*H04N 19/46* (2014.01)
*H04N 21/2343* (2011.01)
(Continued)

(52) U.S. Cl.
CPC ............. *H04N 19/46* (2014.11); *H04N 19/188* (2014.11); *H04N 19/30* (2014.11); *H04N 19/31* (2014.11); *H04N 19/40* (2014.11); *H04N 19/70* (2014.11); *H04N 21/234327* (2013.01);
(Continued)

(58) Field of Classification Search
CPC ............................. H04N 19/46; H04N 19/188
USPC ...................................................... 375/240.26
See application file for complete search history.

(56) References Cited

U.S. PATENT DOCUMENTS

| | | |
|---|---|---|
| 2009/0003439 A1 | 1/2009 | Wang et al. |
| 2010/0161823 A1 | 6/2010 | Jung et al. |
| 2012/0183076 A1* | 7/2012 | Boyce .................. H04N 19/105 375/240.25 |

FOREIGN PATENT DOCUMENTS

WO    WO 2008/085013 A1    7/2008

OTHER PUBLICATIONS

Wenger, S. "RTP Payload Format for Scalable Video Coding", IETF, May 2011. http://www.rfc-editor.org/info/rfc6190.*
(Continued)

*Primary Examiner* — Jeffery Williams
(74) *Attorney, Agent, or Firm* — Myers Bigel & Sibley, P.A.

(57) ABSTRACT

A sub-bitstream extraction process is applicable to a bitstream of multiple access units comprising a respective encoded picture of a video sequence. An access unit among the bitstream is identified and discarded. In addition, all access units in the bitstream that can depend on this access unit are discarded to form a sub-bitstream. The sub-bitstream will not have any access unit that can depend on the identified access units and will be a specification-conforming bitstream.

17 Claims, 5 Drawing Sheets

(51) Int. Cl.
   *H04N 21/4402*   (2011.01)
   *H04N 21/647*   (2011.01)
   *H04N 21/845*   (2011.01)
   *H04N 19/70*   (2014.01)
   *H04N 19/31*   (2014.01)
   *H04N 19/40*   (2014.01)
   *H04N 19/169*   (2014.01)
   *H04N 19/30*   (2014.01)
   *H04N 19/132*   (2014.01)

(52) U.S. Cl.
   CPC   *H04N 21/440227* (2013.01); *H04N 21/64792* (2013.01); *H04N 21/8451* (2013.01); *H04N 19/132* (2014.11)

(56) References Cited

OTHER PUBLICATIONS

International Search Report for PCT Application No. PCT/SE2012/051327 mailed Feb. 15, 2013, 6 pages.

Written Opinion of the International Preliminary Examining Authority for PCT Application No. PCT/SE2012/051327 mailed Feb. 15, 2013, 10 pages.

Wenger et al: "RTP Payload Format for Scalable Video Coding; rfc6190.txt", Internet Engineering Task Force, IETF; Standard, Internet Society (ISOC), Geneva, Switzerland, May 7, 2011, XP015075999; 84 pages.

Samuelsson J et al: "Temporal layer access pictures and CRA", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/, No. JCTVC-G584, Nov. 8, 2011, XP030110568; 5 pages.

Bross B et al: "WD5: Working Draft 5 of High Efficiency Video Coding", 7. JCT-VC Meeting; 98. MPEG Meeting; Nov. 21-30, 2011; Geneva; (Joint Collaborative Team on Video Coding of ITU-T SG.16 WP3 and ISO/IEC JTC1/SC29/WG11); URL:http://wftp3.itu.int/av-arch/jctvc-site/, No. JCTVC-G1103, Dec. 19, 2011, XP030111032; 84 pages.

* cited by examiner

SUB-BITSTREAM EXTRACTION

CROSS REFERENCE TO RELATED APPLICATION

This application is a 35 U.S.C. §371 national stage application of PCT International Application No. PCT/SE2012/051327, filed on 29 Nov. 2012, which itself claims the benefit of U.S. provisional Patent Application No. 61/588,800, filed 20 Jan. 2012, the disclosures and contents of both of which are incorporated by reference herein in their entirety. The above-referenced PCT International Application was published in the English language as International Publication No. WO 2013/109178 A1 on 25 Jul. 2013.

TECHNICAL FIELD

The embodiments generally relate to processing of bitstreams, and in particular to sub-bitstream extraction in connection with layered streams of pictures of a video sequence.

BACKGROUND

H.264 (Moving Picture Experts Group-4 (MPEG-4) Advanced Video Coding (AVC)) is the state of the art video coding standard. It consists of a block based hybrid video coding scheme that exploits temporal and spatial prediction. High Efficiency Video Coding (HEVC) is a new video coding standard currently being developed in Joint Collaborative Team-Video Coding (JCT-VC). JCT-VC is a collaborative project between MPEG and International Telecommunication Union Telecommunication standardization sector (ITU-T). Currently, an HEVC Working Draft (WD) is defined that includes a number of new tools and is considerably more efficient than H.264/AVC. HEVC also defines a temporal_id for each picture, corresponding to the temporal layer the picture belongs to. temporal_id is also present in Scalable Video Coding (SVC), the scalability extension of H.264/AVC.

An HEVC bitstream consists of Network Abstraction Layer (NAL) units which are grouped together in access units. Each access unit contains a picture associated with a decoding order value and an output order value.

It is said that a bitstream conforms to a standard if it fulfills the requirements for bitstream conformance. For HEVC the bitstream conformance requirements can be summarized as:

"It is a requirement of bitstream conformance that the bitstream shall be constructed according to the syntax, semantics, and constraints specified in this Specification outside of this annex. It is a requirement of bitstream conformance that the first coded picture in a bitstream shall be a Random Access Point (RAP) picture, i.e. an Instantaneous Decoder Refresh (IDR) picture or a Clean Random Access (CRA) picture or a Broken Link Access (BLA) picture." "For conforming bitstreams, all of the following conditions shall be fulfilled." HEVC lists ten conditions that must be fulfilled by a conforming bitstream. These ten conditions are listed in the attached Annex A.

Correspondingly, for H.264/AVC the bitstream conformance requirement can be summarized as:

1. "The bitstream is constructed according to the syntax, semantics, and constrains specified in this Recommendation|International standard."

2. "For conforming bitstreams, all of the following conditions shall be fulfilled . . . " H.264/AVC lists seven such conditions which are found in Annex B.

The temporal layers are ordered and have the property that a lower temporal layer never depends on a higher temporal layer. Thus, higher temporal layers can be removed without affecting the lower temporal layers. The removal of temporal layers can be referred to as temporal scaling.

In SVC a sub-bitstream extraction process is defined specifying that a conforming bitstream from which all NAL units with temporal_id higher than a defined value are removed shall also be a conformant bitstream.

The reason to extract a sub-bitstream can, for example, be to adapt the bitrate of a relayed bitstream in a network node based on changes in network conditions.

The existing sub-bitstream extraction processes, e.g. in SVC, have two major problems:

The sub-bitstream extraction process only covers the case when an entire sequence is scaled to a specific layer.

The sub-bitstream extraction process does not give any guarantees to an encoder or a network node regarding scalability. On the contrary, it puts requirements on the bitstream that the encoder and network node must fulfill in order to produce a conforming bitstream. Thus, the encoder must check each sub-bitstream for bitstream conformance. A network node that extracts a sub-bitstream must check the resulting bitstream for bitstream conformance. This makes flexible encoders and network nodes very complex.

SUMMARY

It is a general objective to provide an efficient processing of bitstreams.

It is a particular embodiment to enable sub-bitstream extraction in connection with layered streams or sequences of pictures.

These and other objectives are met by embodiments disclosed herein.

An aspect of the embodiments relates to a sub-bitstream extraction method applicable to a bitstream of multiple access units comprising a respective encoded picture of a video sequence. The method comprises identifying an access unit among the bitstream comprising the multiple access units. This access unit is discarded and also all access units in the bitstream that can depend on this access unit. As a consequence a sub-bitstream having no access unit that can depend on the identified and discarded access unit is formed.

A related aspect of the embodiments defines a sub-bitstream extracting device. The sub-bitstream extracting device comprises an access unit identifier configured to identify an access unit among a bitstream of multiple access units comprising a respective encoded picture of a video sequence. An access unit discarder is configured to discard the access unit and all access units in the bitstream that can depend on the access unit to form a sub-bitstream having no access unit that can depend on the access unit identified by the access unit identifier.

Further relates aspect of the embodiments define a decoder and an encoder comprising the sub-bitstream extracting device and a mobile device comprising such a decoder and/or encoder.

Another aspect of the embodiments relates to sub-bitstream extracting method in a network node. The method comprises discarding access units of a bitstream of multiple access units comprising a respective encoded picture of a video sequence. Each picture of the video sequence has a respective layer identifier identifying a respective layer. The discarding of access units comprises discarding access units with a layer identifier higher than a selected layer identifier X from the bitstream to form a sub-bitstream. The method also comprises relaying, to form an updated bitstream, access units with layer identifier higher than X starting from a layer switching point with a layer identifier equal to X or X+1 in the bitstream. The discarding of access units and the relaying of access units are performed without checking the sub-bitstream and the updated bitstream for bitstream conformance.

Another related aspect of the embodiments defines a network node comprising an access unit discarder configured to discard access units of a bitstream of multiple access units comprising a respective encoded picture of a video sequence. Each picture of the video sequence has a respective layer identifier identifying a respective layer. The access unit discarder is configured to discard access units with layer identifier higher than a selected layer identifier X from the bitstream to form a sub-bitstream. The network node also comprises a relaying unit configured to relay, to form an updated bitstream, access units with layer identifier higher than X starting from layer switching point with a layer identifier equal to X or X+1 in the bitstream. The access unit discarder is configured to discard the access units and the relaying unit is configured to relay the access units without checking the sub-bitstream and the updated bitstream for bitstream conformance.

The embodiments enable a flexible sub-bitstream extraction and simplify the sub-bitstream extraction by automatically outputting sub-bitstreams that are conforming bitstreams without the need for any computationally complex verification for bitstream conformance.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The embodiments generally relate to processing of bitstreams, and in particular to sub-bitstream extraction in connection with layered streams of pictures. The embodiments therefore enable forming sub-bitstreams from a bitstream of coded pictures of a video sequence or stream. Sub-bitstreams are formed by removing selected portions of the bitstream in a particular way. The embodiments perform such sub-bitstream extraction in a computationally efficient manner, thereby significantly simplifying forming sub-bitstreams as compared to prior art techniques requiring verifying bitstream conformance for each formed sub-bitstream.

Hence, the prior art sub-bitstream extraction process requires checking a resulting sub-bitstream for bitstream conformance. Bitstream conformance is well-known in the art and implies that the bitstream or sub-bitstream is constructed according the syntax, semantics and constraints specified in the relevant video coding standard or specification, such as the H.264/AVC specification or the HEVC specification. In addition, for HEVC conforming bitstreams the ten conditions specified in Annex A should be fulfilled, whereas a H.264/AVC conforming bitstream should fulfill the seven conditions specified in Annex B.

This means that the prior art sub-bitstream extraction processes need to check that the formed sub-bitstream fulfills the relevant conditions and is constructed according to the syntax, semantics and constraints specified in the relevant video coding specification. This makes the extraction process computationally complex.

The present embodiments, in clear contrast, relate to a sub-bitstream extraction process that forms a sub-bitstream that will be a conforming bitstream, thereby relaxing the need for any checking or verification of bitstream conformance. This is a major advantage as compared to the prior art.

A further advantage of the sub-bitstream extraction process is that it is not limited to only cover the case where the entire sequence is scaled to a specific layer, such as a temporal layer. In clear contrast, it is possible to remove parts of a sequence without having to remove all parts with the same or higher layer identifier, such as temporal_id, as the removed parts.

In a basic concept the sub-bitstream extraction is done through a process that given the input to remove a specific picture from a bitstream all pictures that might be affected by that picture are also removed.

Various embodiments will now be further described herein with reference to the drawings.

Figure 1:
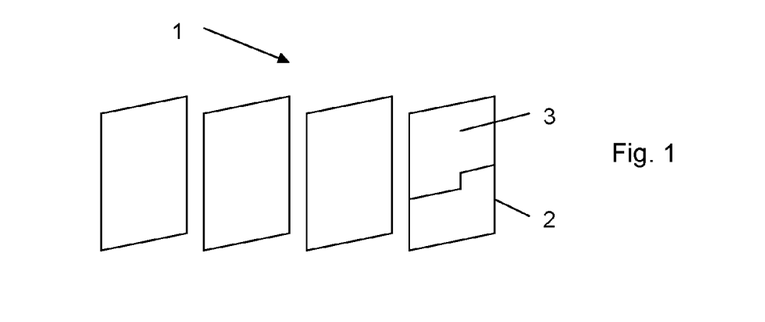
FIG. 1 is a schematic illustration of a video sequence of pictures comprising one or more slices.

FIG. 1 is a schematic overview of a portion of a video sequence or stream 1 of pictures 2. A picture 2 in HEVC and H.264/AVC is portioned into one or more slices 3, where each slice 3 is an independently decodable segment of a picture 2. This means that if a slice 3 is missing, for instance got lost during transmission, the other slices 3 of that picture 2 can still be decoded correctly. Generally, in order to make slices 3 independent, they should not depend on each other. Hence, in a particular embodiment, no bitstream element of a slice 3 is required for decoding any element of another slice 3.

Figure 2:
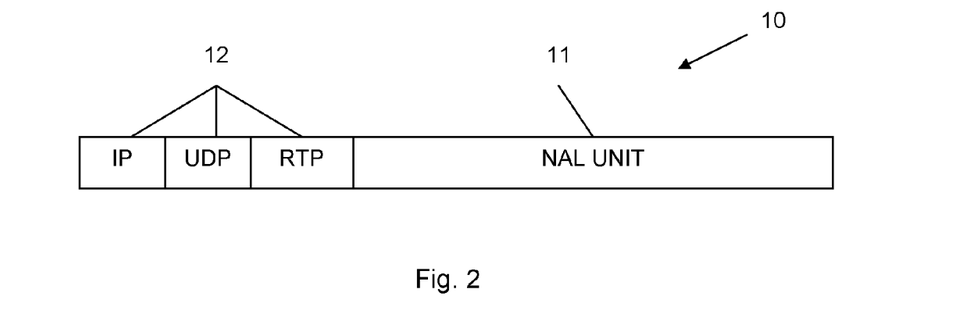
FIG. 2 is an illustration of a data packet comprising a NAL unit.

In HEVC and H.264/AVC a coded video sequence 1, i.e. bitstream, comprises Network Abstraction Layer (NAL) units 11 as illustrated in FIG. 2. Basically, one NAL unit 11 comprises either a slice with a corresponding slice header including control information for that slice or the NAL unit 11 comprises a parameter set. The parameter set comprises control information.

A NAL unit 11 as output from an encoder is typically complemented with headers 12 to form a data packet 10 that can be transmitted as a part of a bitstream from the encoder to the decoder. For instance, Real-time Transport Protocol (RTP), User Datagram Protocol (UDP) and Internet Protocol (IP) headers 12 could be added to the NAL unit 11. This form of packetization of NAL units 11 merely constitutes an example in connection with video transport. Other approaches of handling NAL units 11, such as file format, MPEG-2 transport streams, MPEG-2 program streams, etc. are possible.

Examples of parameter sets that could be carried in NAL units 11 include Adaptation Parameter Set (APS), Picture Parameter Set (PPS) and Sequence Parameter Set (SPS). APS comprises control information valid form more than one slice. The control information may differ between the slices. PPS comprises control information valid for several pictures, and may be the same for multiple pictures of the same video sequence. SPS comprises control information valid for an entire video sequence. Also Video Parameter Set (VPS) is available in HEVC.

Figure 3:
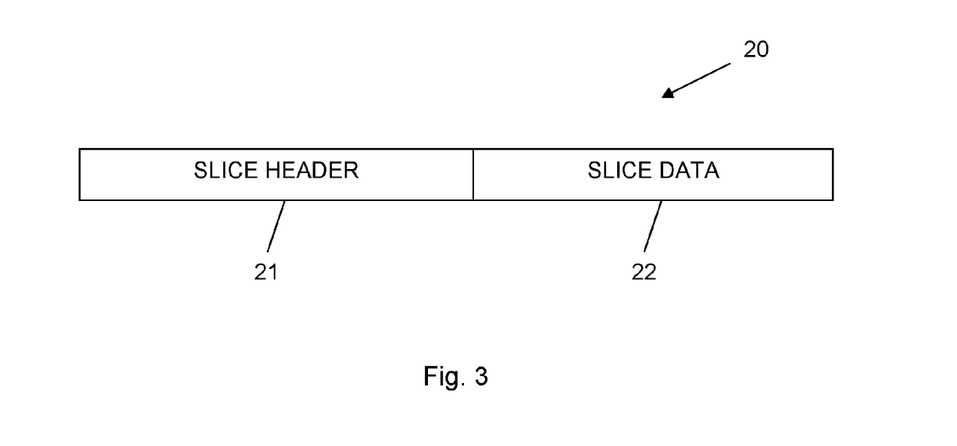
FIG. 3 is an illustration of an encoded representation of a slice.

As shown in FIG. 3 an encoded representation 20 of a slice 3 comprises a slice header 21, which independently provides all required data for the slice 3 to be independently decodeable. An example of a data element present in the slice header 21 is the slice address, which is used by the decoder to know the spatial location of the slice. Another example is the slice quantization delta which is used by the decoder to know what quantization parameter to use for the start of the slice. The encoded representation 20 also comprises, in addition to the slice header 21, slice data 22 that comprises the encoded data of the particular slice 3, e.g. encoded color values of the pixels in the slice 3. A bitstream consists of NAL units 11, which are grouped together in so-called access units. Each access unit contains a picture 2. Hence, an access unit is a set of NAL units 11 that are associated with each other, are consecutive in a decoding order of the video sequence 1 and contain exactly one coded picture. An access unit may, in addition to the NAL units 11 with coded slice data 22 of the coded picture, also contain other NAL units not containing such encoded representations of slices, such as the above mentioned parameter sets.

Figure 4:
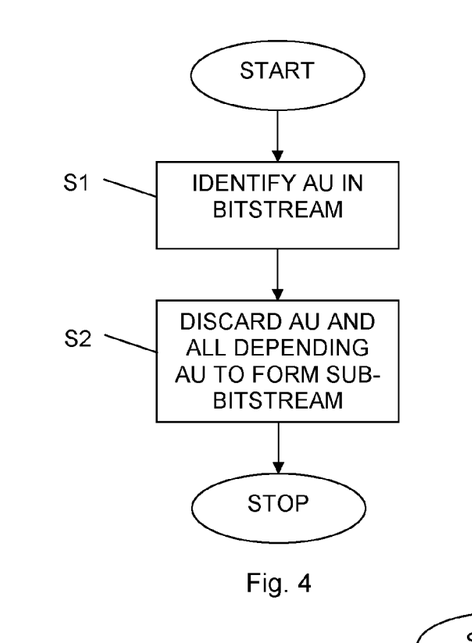
FIG. 4 is a flow diagram of a sub-bitstream extraction method according to an embodiment.

FIG. 4 is a flow diagram illustrating a sub-bitstream extraction method, also denoted bitstream extraction method, which is applicable to a bitstream of multiple access units comprising a respective encoded picture of a video sequence. The method generally starts in step S1. Step S1 comprises identifying an access unit (AU) in or among the bitstream comprising multiple access units. This identified access unit is discarded in step S2 together with all access units in the bitstream that can depend on the access unit identified in step S1. The result of step S2 is the formation of a sub-bitstream having no access unit that can depend on the access unit in step S1.

In an embodiment, a notification or list comprising an identifier of the access unit or indeed of the coded picture carried by the access unit is typically used in step S1 to identify the relevant access unit in the bitstream. Hence, the identification in step S1 is typically performed based on an access unit identifier or a picture identifier, such as in the form of a Picture Order Count (POC) identifier, associated with and enabling identifying of the relevant access unit in the bitstream.

The optional identifier used in step S1 could be received from another unit or device than the particular unit or device that performs the sub-bitstream extraction method. Alternatively, the identifier could be provided or determined by the unit or device that performs the sub-bitstream extraction method, for instance based on feedback information with regard to available bandwidth or bitrate requirements for the current video sequence. Thus, the sub-bitstream extraction could be performed based on changing or varying bandwidth or bitrate levels, or indeed based on feedback information from the decoder or the device comprising the decoder. In the latter case, the user of the device could have selected to use a lower quality level for the display of the video, thereby merely requiring the decoding of a sub-bitstream. In such a case, the device or decoder could provide information indicating that a sub-bitstream should be formed from the bitstream.

In a particular embodiment step S2 involves identifying all access units in the bitstream that can depend on the particular access unit identified in step S1. These identified access unit(s) is(are) then discarded together with the particular access unit in step S2.

An access unit in the bitstream that can depend on the access unit identified in step S1 is identified as directly or indirectly depending on or referencing the access unit identified in step S1.

Video coding, such as in HEVC and H.264/AVC, involves two main coding and decoding modes generally referred to as inter coding that uses inter prediction and intra coding that uses intra prediction. In the former case, i.e. inter coding, a picture or a slice of a picture is encoded and decoded with reference to and based on at least one other picture in the bitstream. In the case of a predictive (P) slice or picture a single respective reference picture is employed for encoding and decoding each block of pixels in the P slice or picture. A bi-predictive (B) slice or picture can use two respective reference pictures for encoding and decoding each block of pixels in the B slice or picture. Hence, such P and B slices and pictures are encoded and decoded with reference to and depending on other pictures, denoted reference pictures, in the video sequence.

Hence, if a picture B is encoded based on data in another picture A in the video sequence this picture B directly depends on the picture A. It could also be possible that a further picture C is encoded based on data in the picture B. This means that this picture C indirectly depends on the picture A since picture C is encoded relative to the picture B, which in turn is encoded relative to the picture A.

In a particular embodiment of the method in FIG. 4, a list of multiple identifiers, such as access unit identifiers or picture identifiers, is provided in step S1. In such a case, in an embodiment step S2 is performed for each access unit identified from the list. For instance, if the list identifies N access units, step S2 is preferably performed N times, i.e. one for each identified access unit.

Hence, in an embodiment a list of values is given as input to the sub-bitstream extraction process. The access units that correspond to these values are removed from the bitstream. Further, all access units that depend on/can depend on (reference/can reference) the removed access units are removed from the sequence, i.e. video sequence, iteratively until there are no access unit in the resulting sub-bitstream that depends on/can depend on (references/can reference) a removed access unit.

Each picture of the video sequence preferably has, in an embodiment, a respective layer identifier identifying a respective layer in the video sequence. In this embodiment step S2 preferably comprises discarding the access unit identified in step S1 and all access units in the bitstream having layer identifier higher than or equal to the layer identifier of the access unit identified in step S1 and following the access unit identified in step S1 according to a decoding order of the bitstream but preceding, according to a defined order of the bitstream, any next layer switching point having a layer identifier lower than or equal to the layer identifier of the access unit identified in step S1.

The above disclosed embodiment therefore relates to so-called layered video sequences wherein the video sequence comprises multiple, i.e. at least two, layers of pictures. Such layered video sequences are typically employed, for instance, to achieve scalability, including temporal scalability, spatial scalability, etc., and/or in the case of multi-view video, such as stereoscopic video. In such a case, each picture could have a respective temporal identifier and/or view identifier as illustrative examples, where the temporal identifier identifies the temporal layer of the video sequence to which the picture belongs and the view identifier identifies the camera view to which the picture belongs to.

A layer switching point is a point in the bitstream at which it is possible to switch decoding of more layers of the video sequence than what was decoded before the layer switching. Hence, the layer switching points enables a decoder, during the decoding process of the bitstream, to start decoding and thereby outputting, such as for display, pictures belonging to a higher layer than what is currently being decoded and output.

There are generally two variants of layer switching points. In a first variant, also denoted "switch-from" variant, the layer switching point indicates the picture where it is possible to switch from a current layer to decoding more layers of the video sequence. In a second variant, also denoted "switch to" variant, the layer switching point indicates the picture that it is possible to do layer switching to.

In an embodiment, only the first or "switch-from" variant is available, whereas in other embodiments only the second or "switch-to" variant is available or both the first and second variants are available.

If the next layer switching point is of the "switch-from" variant step S2 preferably comprises discarding all access units in the bitstream having layer identifier higher than or equal to the layer identifier of the access unit identified in step S1 and following the access unit identified in step S1 according to the decoding order but preceding, according to the defined order, a next layer switching point (of the "switch-from" variant) having a layer identifier lower than the layer identifier of the access unit identified in step S1.

Correspondingly, if the next layer switching point is of the "switch-to" variant step S2 preferably comprises discarding all access units in the bitstream having layer identifier higher than or equal to the layer identifier of the access unit identified in step S1 and following the access unit identified in step S1 according to the decoding order but preceding, according to the defined order, a next layer switching point (of the "switch-to" variant) having a layer identifier lower than or equal to the layer identifier of the access unit identified in step S1.

In a particular embodiment, each picture of the video sequence has a respective temporal identifier, temporal_id, identifying a respective temporal layer of the video sequence. In such a case, a layer switching point is a temporal layer switching point. Such a temporal layer switching point is preferably selected from a group consisting of a Temporal Sub-layer Access (TSA) picture, also denoted Temporal Layer Access (TLA) picture; an Instantaneous Decoding Refresh (IDR) picture and other Random Access Point (RAP) pictures.

The embodiment of step S2 that is adapted to layered video compares the layer identifier of following, according to the decoding order, access units in the bitstream with the layer identifier of the access unit identified in step S1. In more detail, if a following, according to the decoding order, access unit carries a picture with a layer identifier that is at least equal to the layer identifier of the access unit identified in step S1 this access unit is identified as an access unit that can depend on the access unit identified in step S1. This is possible since, in an embodiment, a lower layer should never depend on a higher layer. Thus, a picture belonging to a layer $L_n$ could be encoded depending on or referencing a picture in layer $L_n$ or in layer $L_{n-m}$ but not relative to a picture in layer $L_{n+k}$, wherein k, m, n are positive integers and n>m.

In this embodiment the layer switching points are used to detect the limits of which pictures and access units that need to be removed. Hence, in step S2 preferably only access units preceding, according to the defined order of the bitstream, any next layer switching point are considered with regard to discarding to form the sub-bitstream. This is possible since it is guaranteed that a picture that follows a layer switching point is not affected by, i.e. does not depend on, a picture of the same or higher temporal layer as the switching point, which precedes the layer switching point.

A particular embodiment therefore uses three criteria in order to determine or identify an access unit in the bitstream as an access unit that can depend on the access unit identified in step S1:

1) the access unit has a layer identifier, such as temporal identifier, that is higher than or equal to the layer identifier, such as temporal identifier, of the access unit identified in step S1;

2) the access unit follows the access unit identified in step S1 according to the decoding order of the bitstream; and 3) the access unit precedes, according to the defined order of the bitstream, any next layer switching point, such as temporal layer switching point, having a layer identifier, such as temporal identifier, lower than or equal ("switch-to" variant) or lower than ("switch from" variant) to the layer identifier, such as temporal identifier, of the access unit identified in step S1.

HEVC also defines a Stepwise Temporal Sub-layer Access point (STSA). For this type of switching point the indication has to have a layer identifier, such as temporal identifier, exactly equal to the layer identifier, such as temporal identifier, of the layer that you would like to switch to in order to make switching possible. Thus, in such a case the criterion 3) is:

3) the access unit precedes, according to the defined order of the bitstream, any next STSA having a temporal identifier equal the temporal identifier of the access unit identified in step S1.

In an embodiment, temporal layer switching points with certain values of temporal_id are used to find the limits for which pictures can depend on a removed picture. By using temporal layer switching points to find the limits, the removal of dependent pictures only needs to be applied once, i.e. not in an iterative fashion, since there is no dependency across a temporal layer switching point of a certain temporal_id.

The defined order of the bitstream mentioned above in criterion 3) is, in an embodiment, the decoding order of the access units in the bitstream. In another embodiment, the defined order of the bitstream is the output order of the decoded pictures represented by the encoded pictures in the bitstream.

The decoding order defines the order at which coded pictures of the bitstream are decoded. Hence, a picture with decoding order number N is decoded prior to a picture with decoding order number N+1. Output order defines the order at which decoded pictures are output. Output of pictures typically implies output for display on a screen of or connected (wired or wirelessly) to the decoder. Output of pictures could, however, be for other purposes than display, for instance, output for storage in a file, output for transcoding, or output for post-decoding processing.

Generally, a picture with output order number M is output prior to a picture with output order number M+1. Note that a picture with decoding order number N+k could be output prior to a picture with decoding order number N, where k is a positive integer. In HEVC output order is specified by a Picture Order Count (POC) value.

An embodiment of step S2 involves discarding the access unit identified in step S1 from the bitstream. Step S2 additionally comprises discarding all access units in the bitstream meeting the criteria 1)-3) above if the bitstream comprises a next layer switching point having a layer identifier lower than or equal to the layer identifier of the access unit identified in step S1 and following the access unit identified in step S1 according to the defined order in the bitstream. If the bitstream does not comprise any such next layer switching point having a layer identifier lower than or equal to the layer identifier of the access unit identified in step S1 and following the access unit identified in step S1 according to the defined order step S2 instead preferably comprises discarding all access units in the bitstream meeting the criteria 1) and 2) above.

Thus, in the former case all access units in the bitstream having layer identifier higher than or equal to the layer identifier of the access unit identified in step S1 and following the access unit according to the decoding order but preceding, according to the defined order, a next layer switching point having a layer identifier lower than or equal to the layer identifier of the access unit identified in step S1 are discarded if the bitstream comprises such a next layer switching point. If no such next layer switching point is present in the bitstream step S2 preferably comprises discarding all access units in the bitstream having layer identifier higher than or equal to the layer identifier of the access unit identified in step S1 and following the access unit identified in step S1 according to the decoding order.

In a particular embodiment step S2 comprises discarding the access unit identified in step S1 and all access units in the bitstream having layer identifier higher than or equal to the layer identifier of the access unit identified in step S1 and following the access unit identified in step S1 according to a decoding order of the bitstream but preceding, according to the decoding order, any next layer switching point having a layer identifier lower than or equal to the layer identifier of the access unit identified in step S1.

In another particular embodiment step S2 comprises discarding the access unit identified in step S1 and all access units in the bitstream having layer identifier higher than or equal to the layer identifier of the access unit identified in step S1 and following the access unit identified in step S1 according to a decoding order of the bitstream but preceding, according to an output order of the bitstream, any next layer switching point having a layer identifier lower than or equal to the layer identifier of the access unit identified in step S1.

The discarding in step S2 of the access unit identified in step S1 and of all the access units that can depend on this access unit is preferably performed without decoding this access unit. This significantly reduces the complexity of the sub-bitstream extracting method as compared to first decoding the access unit and the coded picture contained therein and then discarding the decoded picture and access unit.

Figure 5:
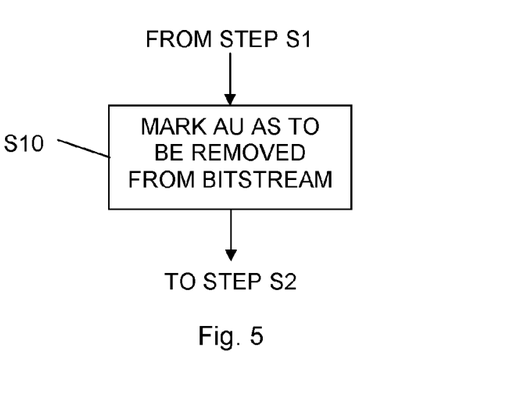
FIG. 5 is a flow diagram illustrating an additional, optional step of the method in FIG. 4 according to an embodiment.

FIG. 5 is a flow diagram illustrating an additional, optional step of the method in FIG. 4. The method continues from step S1 in FIG. 4. In a next step S10 the access unit identified in step S1 is marked as "to be removed from the bitstream". This step S10 preferably also comprises marking all access units in the bitstream that can depend on the access unit identified in step S1 as "to be removed from the bitstream". The method then continues to step S2 of FIG. 4. In this embodiment step S2 preferably comprises discarding all access units of the bitstream that are marked as "to be removed from the bitstream". Hence, the access unit or picture marking is preferably employed in order to identify those access units or pictures of the bitstream that should be discarded.

Marking an access unit as "to be removed from the bitstream" could be performed by marking all NAL units of that access unit as "to be removed from the bitstream". In such a case, step S2 preferably comprises removing or discarding all NAL units that are marked as "to be removed from the bitstream".

A particular implementation example will now be further described with regard to the sub-bitstream extraction process.

Input to this process is an ordered list of integers au_num (access unit number), in increasing order, with N elements, where N is in the range of 0 to the number of access units in the bitstream, inclusive. Each element au_num[i] in the list, for i in the range from 0 to N−1, has a value in the range from 0 to the number of access units in the bitstream.

Output of this process is a sub-bitstream that conforms to the video coding standard or specification.

The sub-bitstream is derived by applying the following operations in sequential order:

1. For each i in the range of 0 to N−1 the following applies:
   a. Let j=au_num[i], let auX be the $j^{th}$ access unit in decoding order and, when there is an access unit with a TLA picture or IDR picture with temporal_id lower than or equal to the temporal_id of auX that follows auX in output order, call that access unit auY.

In an embodiment, auY may precede auX in decoding order.

b. If there is an access unit auY, then for each access unit auZ with temporal_id higher than or equal to the temporal_id of auX that follows auX in the decoding order and precedes auY in output order, mark all NAL units of auZ as "to be removed from the bitstream".
   c. Otherwise, i.e. there is no access unit auY, then for each access unit auZ with temporal_id higher than or equal to the temporal_id of auX that follows auX in decoding order, mark all NAL units of auZ as "to be removed from the bitstream".

2. Remove all NAL units marked as "to be removed from the bitstream".

In another implementation example the sub-bitstream is derived by applying the following operations in sequential order:

1. For each i in the range of 0 to N−1 the following applies:
   a. Let j=au_num[i], let auX be the $j^{th}$ access unit in decoding order and, when there is an access unit with a TLA picture or IDR picture with temporal_id lower than or equal to the temporal_id of auX that follows auX in decoding order, call that access unit auY.
   b. If there is an access unit auY, then for each access unit auZ with temporal_id higher than or equal to the temporal_id of auX that follows auX in the decoding order and precedes auY in the decoding order, mark all NAL units of auZ as "to be removed from the bitstream".
   c. Otherwise, i.e. there is no access unit auY, then for each access unit auZ with temporal_id higher than or equal to the temporal_id of auX that follows auX in decoding order, mark all NAL units of auZ as "to be removed from the bitstream".

2. Remove all NAL units marked as "to be removed from the bitstream".

In a particular embodiment of these implementation examples, when au_num contains the integers that correspond to all access units with temporal_id higher than a variable tIdTarget, the entire sequence will be scaled to only contain temporal layers lower than or equal to tIdTarget.

The sub-bitstream extraction process can be performed in an encoder, a decoder or in a network node.

In an embodiment, when a "switch-to" variant or definition is used for switching points a decoder may use the sub-bitstream extraction process as exemplified below.

When decoding a bitstream a decoder may choose to discard an access unit without decoding it, e.g. for complexity reasons.

By also discarding all access units with the same or higher temporal_id as the discarded picture that precedes the next temporal layer switching point, e.g. TLA picture, in output order (or alternatively decoding order) with a temporal_id lower than or equal to the temporal_id of the discarded picture, the decoder can still decode all other access units and be guaranteed that it is a valid bitstream because the pictures that follow the temporal layer switching point are not in any way affected by the discarded pictures. If there is no temporal layer switching point that follows the discarded picture with a temporal_id lower than or equal to the temporal_id of the discarded picture, all access units with the same or higher temporal_id as the discarded picture are discarded until the end of the bitstream.

In an embodiment, when a "switch-from" variant or definition is used for switching points a decoder may use the sub-bitstream extraction process as exemplified below.

When decoding a bitstream a decoder may choose to discard an access unit without decoding it, e.g. for complexity reasons.

By also discarding all access units with the same or higher temporal_id as the discarded picture that precedes the next temporal layer switching point in output order (or alternatively decoding order) with a temporal_id lower than the temporal_id of the discarded picture, the decoder can still decode all other access units and be guaranteed that it is a valid bitstream because the pictures that follow the temporal layer switching point are not in any way affected by the discarded pictures. If there is no temporal layer switching point that follows the discarded picture with a temporal_id lower than the temporal_id of the discarded picture, all access units with the same or higher temporal_id as the discarded picture are discarded until the end of the bitstream.

An advantage of embodiments is that each sub-bitstream created from a conforming bitstream using the sub-bitstream extraction process disclosed herein is a conforming bitstream. Hence, no bitstream conformance verification or check needs to be conducted on the formed sub-bitstream.

In an optional embodiment a condition may be added for bitstream conformance in order to ensure that the Decoded Picture Buffer (DPB) requirements are fulfilled for each temporal layer, see condition 6 in Annex A and condition 5 in Annex B.

At any time instant, there shall be at most max_dec_frame_buffering[i] pictures with temporal_id lower than or equal to i in the DPB for all i in the range of 0 to max_temporal_layers_minus1, inclusive. The parameter or syntax element max_dec_frame_buffering[i] is preferably signaled for each temporal layer, preferably in the SPS or in another parameter set.

In an optional embodiment, the condition mentioned above replaces the condition that the fullness of the DPB shall be less than or equal to the DPB size, see condition 6 in Annex A and condition 5 in Annex B.

A further advantage of the embodiments is that sub-bitstream extraction process can remove or discard access units and pictures from anywhere in the bitstream. Hence, the sub-bitstream extraction process does not require the removal of complete layers, i.e. scaling the entire video sequence to a specific layer. The sub-bitstream extraction process does furthermore not require the removal of entire layers between layer switching points. Hence, the removal of pictures can start anywhere in the bitstream and does not need to be aligned with or started from such a layer switching point. As a consequence, a very flexibly but also computationally efficient sub-bitstream process is achieved.

In a particular embodiment, the access unit identified in step S1 of FIG. 4 is not a layer switching point, such as TLA picture. Hence, in a particular embodiment, the access unit preferably comprises a coded picture that is present in the bitstream between such layer switching points.

The present embodiments are in particular suitable for usage in connection with HEVC. In such a case, the sub-bitstream extraction method and device are applicable to a HEVC-conforming bitstream of multiple access units.

In a particular implementation example, the embodiments are applied to HEVC-conforming bitstreams of multiple access units and HEVC codecs. In this implementation example, the bitstream comprises the previously mentioned "switched to" and/or "switch from" TLA pictures. Furthermore, a Constant Bit Rate (CBR) flag, cbr_flag, is preferably set to 0. In such a case, a cbr_flag set to 0 preferably specifies that to decode the bitstream by a Hypothetical Reference Decoder (HRD), a Hypothetical Stream Delivery Scheduler (HSS) operates in an intermittent bit rate mode.

HRD is a hypothetical decoder model that specifies constraints on the variability of conforming NAL unit streams or conforming byte streams that an encoding process may produce. A HSS is a hypothetical delivery mechanism for the timing and data flow of the input of a bitstream into the HRD. The HSS is used for checking the conformance of a bitstream or a decoder.

An aspect of the embodiments relates to a method in an encoder for bitstream extraction, i.e. the sub-bitstream extraction method can be performed in an encoder.

Another aspect of the embodiments relates to a method in a decoder for bitstream extraction, i.e. the sub-bitstream extraction method can be performed in a decoder.

Figure 6:
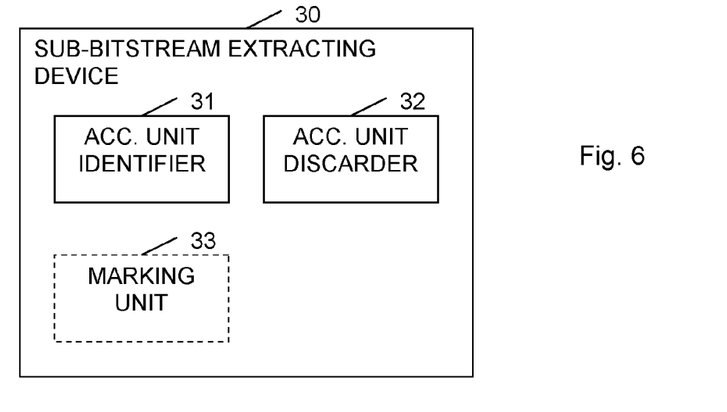
FIG. 6 is a schematic block diagram of a sub-bitstream extracting device according to an embodiment.

FIG. 6 is a schematic block diagram of a sub-bitstream extracting device 30 according to an embodiment. The sub-bitstream extracting device 30 preferably comprises an access unit identifier 31, also denoted access unit identifying unit, means or module. The access unit identifier 31 is configured to identify an access unit among a bitstream of multiple access units. Each such access unit of the bitstream comprises a respective encoded picture of a video sequence. An access unit discarder 32, also denoted access unit discarding unit, means or module, is configured to discard the access unit identified by the access unit identifier 31 and all access units in the bitstream that can depend on the access unit. The operation of the access unit discarder 32 forms a sub-bitstream having no access units that can depend on the access unit as identified by the access unit identifier 31.

In a particular embodiment the access unit identifier 31 is further configured to identify the access units in the bitstream that can depend on the access unit. This can, for instance, be performed by identifying those access units in the bitstream that directly or indirectly depends on or references the particular access unit as disclosed herein. In a particular embodiment, the access unit identifier 31 is configured to identify the access units in the bitstream that can depend on the particular access unit based on respective layer identifiers of the access units and the layer identifier of the particular access unit. Furthermore, the access unit identifier 31 preferably also uses respective access unit or picture numbers in the identification of the access units in order to perform the identification among access units that follow the particular access unit according to the decoding order.

Thus, in an embodiment each picture of the video sequence has a respective layer identifier identifying a respective layer. The access unit discarder 32 is then configured to discard the access unit and all access units in the bitstream having layer identifier higher than or equal to the layer identifier of the access unit and following this access unit according to the decoding order but preceding, according to a defined order, such as output order or decoding order, any next layer switching point having a layer identifier lower than or equal to the layer identifier of this access unit.

If the next layer switching point is of the previously mentioned "switch-to" variant, the relevant next layer switching point preferably has a layer identifier, such as temporal_id, lower than or equal to the layer identifier, such as temporal_id, of the access unit identified by the access unit identifier 31.

If the next layer switching point is instead of the previously mentioned "switch-from" variant, the relevant next layer switching point preferably has a layer identifier, such as temporal_id, lower than the layer identifier, such as temporal_id, of the access unit identified by the access unit identifier 31.

In a particular embodiment the access unit discarder 32 is configured to discard the access unit identified by the access unit identifier 31 from the bitstream. The access unit discarder 32 is also configured to discard all access units in the bitstream having layer identifier higher than or equal to the layer identifier of this access unit and following this access unit according to the decoding order but preceding, according to the defined order, a next layer switching point having a layer identifier lower than or equal to the layer identifier of this access unit if the bitstream comprises such a layer switching point. If there are no such layer switching point in the bitstream the access unit discarder 32 is preferably configured to discard all access units in the bitstream having layer identifier higher than or equal to the layer identifier of this access unit and following this access unit according to the decoding order.

In a first implementation embodiment the access unit discarder 32 is configured to discard the access unit and all access units in the bitstream having layer identifier higher than or equal to the layer identifier of the access unit and following this access unit according to the decoding order but preceding, according to the decoding order, any next layer switching point having a layer identifier lower than or equal to the layer identifier of this access unit.

In a second implementation embodiment the access unit discarder 32 is configured to discard the access unit and all access units in the bitstream having layer identifier higher than or equal to the layer identifier of the access unit and following this access unit according to the decoding order but preceding, according to the output order, any next layer switching point having a layer identifier lower than or equal to the layer identifier of this access unit.

The sub-bitstream extracting device 30 optionally comprises a marking unit 33, also denoted access unit marker or marking means or module. The marking unit 33 is configured to mark the access unit identified by the access unit identifier 31 as "to be removed from the bitstream". The marking unit 33 is preferably also configured to mark all access units in the bitstream that can depend on this access unit as "to be removed from the bitstream".

The access unit discarder 32 is, in this embodiment, preferably configured to discard or remove all access units of the bitstream that are marked as "to be removed from the bitstream".

As previously disclosed herein the access unit discarder 32 is preferably configured to discard the access units prior to decoding them.

The sub-bitstream extracting device 30 of FIG. 6 with its including units 31-33 could be implemented in hardware. There are numerous variants of circuitry elements that can be used and combined to achieve the functions of the units 31-33 of the sub-bitstream extracting device 30. Such variants are encompassed by the embodiments. Particular examples of hardware implementation of the sub-bitstream extracting device is implementation in digital signal processor (DSP) hardware and integrated circuit technology, including both general-purpose electronic circuitry and application-specific circuitry.

The sub-bitstream extracting device 30 can also be implemented by means of a processor and a memory. Thus, in an embodiment the sub-bitstream extracting device 30 is implemented e.g. by one or more of a processor and adequate software with suitable storage or memory therefore, a programmable logic device (PLD) or other electronic component(s).

Figure 7:
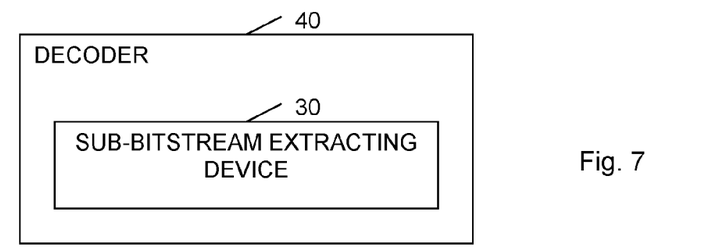
FIG. 7 is a schematic block diagram of a decoder according to an embodiment.

An aspect of the embodiments relates to a decoder for bitstream extraction. FIG. 7 is a schematic block diagram of such a decoder 40 comprising a sub-bitstream extracting device 30 as described above and disclosed in FIG. 6. In an alternative embodiment, the units of the sub-bitstream extracting device 30, i.e. the access unit identifier 31, the access unit discarder 32 and the optional marking unit 33 could be directly implemented in the decoder 40.

Figure 8:
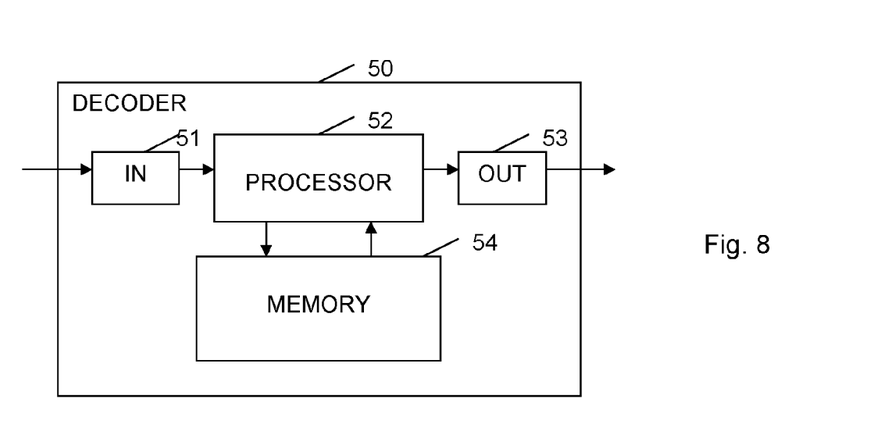
FIG. 8 is a schematic block diagram of a decoder according to another embodiment.

The functionality of the decoder 50 can be implemented by means of a processor 52 and a memory 54 as illustrated in FIG. 8.

In addition, the decoder 50 preferably comprises an input or input unit 51 configured to receive the access units or coded pictures of the bitstreams. A corresponding output or output unit 53 is configured to output decoded pictures.

Figure 9:
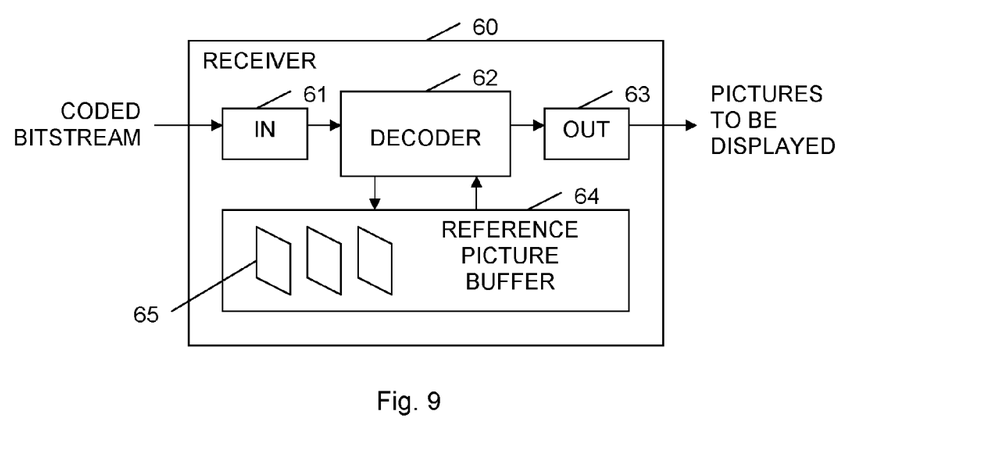
FIG. 9 is a schematic block diagram of a receiver according to an embodiment.

The decoder can be implemented in a device, such as a mobile device exemplified as mobile phones, tablets, video camera, set-top-box, etc. FIG. 9 illustrates such an example where the decoder 62 is located in a receiver 60. The receiver 60 then comprises an input or input unit 61 configured to receive a coded bitstream. The coded bitstream is preferably, in addition to being decoded, also subject to a sub-bitstream extraction process to thereby, for at least a portion of the bitstream, form such a sub-bitstream that could be decoded by the decoder 62. The decoder 62 preferably comprises or is connected to a reference picture buffer 64, i.e. DPB, that temporarily stores already decoded reference pictures 65 that are to be used as reference pictures for other pictures in the video stream. Decoded pictures are output from the receiver 60, such as from the reference picture buffer 64, by means of an output or output unit 63. These output pictures are typically sent to be displayed to a user on a screen or display of or connected, including wirelessly connected, to the receiver 60.

Figure 10:
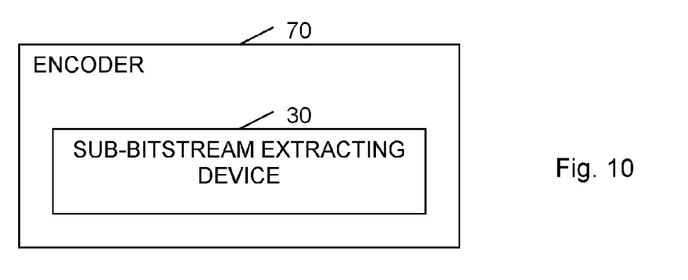
FIG. 10 is a schematic block diagram of an encoder according to an embodiment.

An aspect of the embodiments relates to an encoder for bitstream extraction. FIG. 10 is a schematic block diagram of such an encoder 70 comprising a sub-bitstream extracting device 30 as described above and disclosed in FIG. 6. In an alternative embodiment, the units of the sub-bitstream extracting device 30, i.e. the access unit identifier 31, the access unit discarder 32 and the optional marking unit 33 could be directly implemented in the encoder 70.

An encoder may use the embodiments by setting the layer values, such as temporal_id values, of the access units in the bitstream and by only validating the conformance of the full bitstream. Hence, there is no need to validate conformance of the sub-bitstreams as it follows by the sub-bitstream extraction process definition that they will be conforming bitstreams. Thus, the conformance of the sub-bitstreams is guaranteed by the standard.

The encoder can signal layer switching points, such as temporal layer switching points, for each picture for which the reference are according to the definition of the layer switching point.

The encoder does not need to consider the DPB status for all different possible extracted sub-bitstreams.

Figure 11:
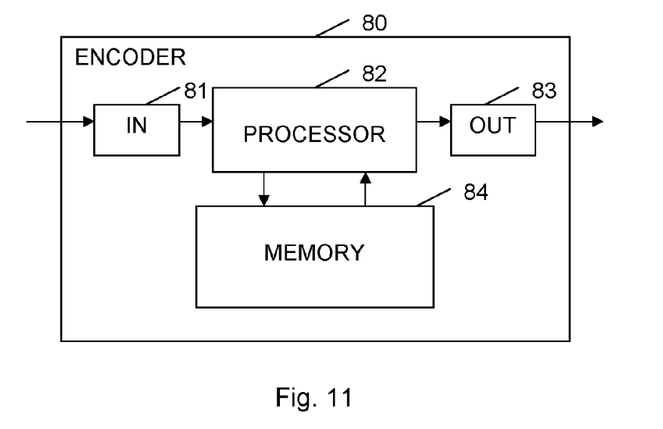
FIG. 11 is a schematic block diagram of an encoder according to another embodiment.

The functionality of the decoder 80 can be implemented by means of a processor 82 and a memory 84 as illustrated in FIG. 11.

In addition, the encoder 80 preferably comprises an input or input unit 81 configured to receive the pictures of the video sequence. A corresponding output or output unit 83 is configured to output the coded pictures, such as in the form of access units comprising NAL units.

Figure 12:
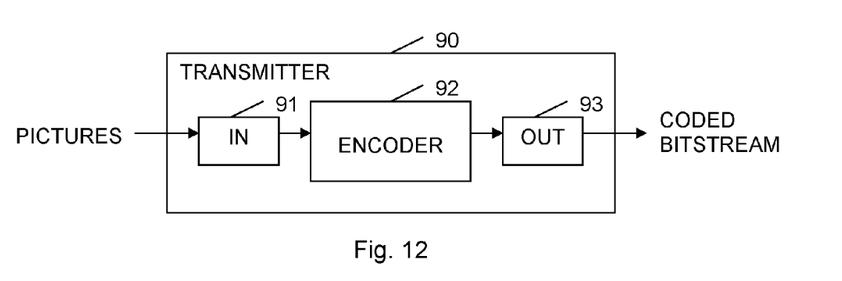
FIG. 12 is a schematic block diagram of a transmitter according to an embodiment.

The encoder can be implemented in a device, such as a mobile device exemplified as mobile phones, tablets, video camera, etc. FIG. 12 illustrates an example of such a device in the form of a transmitter 90. The transmitter 90 then comprises an input or input unit 91 configured to receive pictures of a video sequence to be encoded. The pictures are encoded by the encoder 92 to form a coded bitstream of access units. The coded bitstream is output from the transmitter 90 by an output or output unit 93. The encoder 92 is preferably configured to form a sub-bitstream as disclosed herein from the bitstream.

Another aspect of the embodiments relates to a method in a network node for bitstream extraction. The network node can start discarding access units with a layer identifier, such as temporal_id, higher than a selected layer identifier X from a relayed bitstream at any point in time. The network node can then start relaying access units with layer identifier, such as temporal_id, higher than X at any layer switching point, such as TLA picture, with layer identifier, such as temporal_id, equal to X or X+1.

The advantage of this sub-bitstream extraction method is the discarding of access units and the relaying of access units can be performed without checking the resulting sub-bitstream for bitstream conformance.

Figure 13:
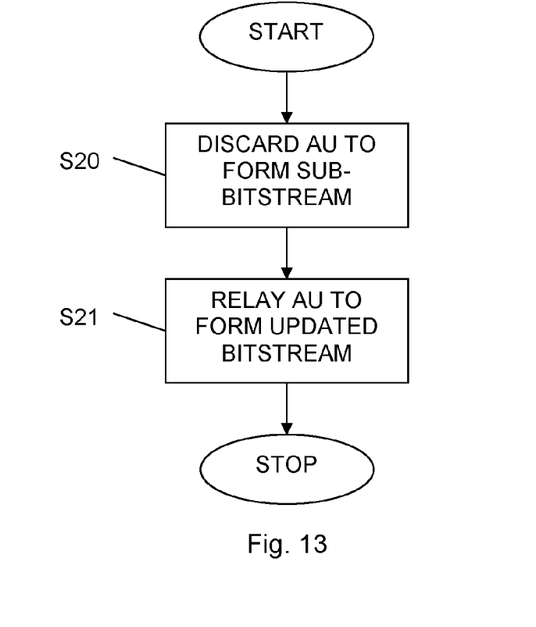
FIG. 13 is a flow diagram of a bitstream extraction method according to another embodiment.

FIG. 13 is a flow diagram illustrating an embodiment of such a sub-bitstream extraction method. The sub-bitstream extraction method is configured to be performed in or by a network node. The method starts in step S20, in which access units of a bitstream of multiple access units are discarded to form a sub-bitstream. Each access unit of the bitstream comprises a respective encoded picture of a video sequence. Each picture of the video sequence has a respective layer identifier identifying a respective layer to which the picture belongs. In step S20 access units with layer identifier higher than a selected layer identifier X are discarded from the bitstream to form the sub-bitstream.

A next step S21 comprises relaying access units with layer identifier higher than X starting from a layer switching point with a layer identifier equal to X or X+1 to form an updated bitstream.

The discarding of access units in step S20 and the relaying of access units in step S21 are performed without checking the sub-bitstream and the updated bitstream for bitstream conformance.

The network node preferably receives the bitstream originating from a transmitter as disclosed in FIG. 12 and should relay or forward the access units of the bitstream towards a receiver as disclosed in FIG. 9.

In an embodiment of step S20, the discarding of access unit is performed based on information specifying that access units belonging to layers higher than the selected layer identifier X should be removed from the bitstream. This information specifying the value X could be received from an external unit, such as a transmitter of FIG. 12, an encoder of FIG. 10 or 11, a receiver of FIG. 9 or a decoder of FIG. 7 or 8. Alternatively, the network node itself could determine this value X based on various input parameters, such as current available bandwidth for the bitstream and/or a desired current bitrate for the bitstream.

The discarding of step S20 thereby removes access units from one or more layers starting at a selected point in the bitstream. The access units of the bitstream that are not removed from this selected point form the sub-bitstream. These access units of the sub-bitstream are preferably relayed or forwarded by the network node towards an intended receiver and decoder.

At a later selected point in the bitstream the network node should start relaying access units belong to a higher layer than X. Thus, at this later selected point more layers of pictures should be relayed and forwarded towards the receiver and decoder than prior to the later selected point.

For instance, assume a video sequence comprises pictures of four different layers denoted layer 0 to 3. Step S20 could then, as an illustrative but non-limiting example, discard access units belonging to layer 2 and access units belonging to layer 3. Hence, the sub-bitstream that is relayed by the network node then carries access units with coded pictures belonging to layer 0 or layer 1. The network node can then start relaying pictures of a higher layer to form the updated bitstream. For instance, this updated bitstream could comprise access units with coded pictures belonging to layer 0-2 or indeed access units with coded pictures belonging to layer 0-3.

The selection of which layers to include in the updated bitstream could be performed based on information as received from the transmitter or receiver, or indeed based on updated bandwidth and/or bitrate parameters.

The relaying of the updated bitstream occurs at a layer switching point that either has a layer identifier equal to X or equal to X+1, which is further discussed herein.

A significant advantage of the sub-bitstream extraction method disclosed above as compared to prior art extraction processes is that the discarding and relaying of access units in steps S20 and S21 can be performed without the need for checking or verifying that the formed sub-bitstream and updated bitstream are conforming bitstreams. In clear contrast, by performing the discarding and relaying as disclosed herein the sub-bitstream and the updated bitstream are guaranteed to be conforming bitstreams.

Checking the sub-bitstream and the updated bitstream for bitstream conformance corresponds to verifying that the sub-bitstream and the updated bitstream fulfill the requirements of the relevant video coding standard. In particular, checking for bitstream conformance comprises verifying that each of the conditions specified in Annex A for HEVC or in Annex B for H.264/AVC are fulfilled or other such conditions as defined for the relevant video coding standard.

In an embodiment, each picture of the video sequence has a respective temporal identifier, termporal_id, identifying a respective temporal layer. In an embodiment, the layer switching point is a TLA picture, to which it is possible to perform temporal layer switching, i.e. the so-called switch-to variant. In such a case, step S21 preferably comprises relaying, to form the updated bitstream, access units with temporal identifier higher than X starting from the TLA picture with a temporal identifier equal to X+1 in the bitstream.

Thus, when a switch-to definition is used for switching points a network node may perform the following ordered steps. The network node can start discarding access units with temporal_id higher than X from a relayed bitstream at any point in time, for any value of X as selected by the network node. It can then start relaying access units with temporal_id higher than X at any temporal layer switching point, e.g. TLA picture, with temporal_id equal to X+1 because these access units are not in any way affected by the discarded picture.

In another embodiment, the so-called switch-from variant is available, i.e. the layer switching point is a TLA picture from which it is possible to perform temporal layer switching. Step S21 preferably comprises relaying access units, to form the updated bitstream, with temporal identifier higher than X starting from the TLA picture with a temporal identifier equal to X in the bitstream.

When a switch-from definition is used for switching points a network node may perform the following ordered steps. The network node can start discarding access units with temporal_id higher than X from a relayed bitstream at any point in time for any value of X as selected by the network node. It can then start relaying access units with temporal_id higher than X at any temporal layer switching point, e.g. TLA picture, with temporal_id equal to X because these access units are not in ay way affected by the discarded pictures.

In a particular embodiment the method as illustrated in FIG. 13 may optionally comprise declaring that the formed sub-bitstream and the updated bitstream are conforming bitstreams and where this declaration is performed without checking the sub-bitstream and the updated bitstream for bitstream conformance.

The optional declaration may in a particular example be in the form of setting a flag or other syntax element to a defined value indicating that the formed sub-bitstream and the updated bitstream are conforming bitstreams.

Figure 14:
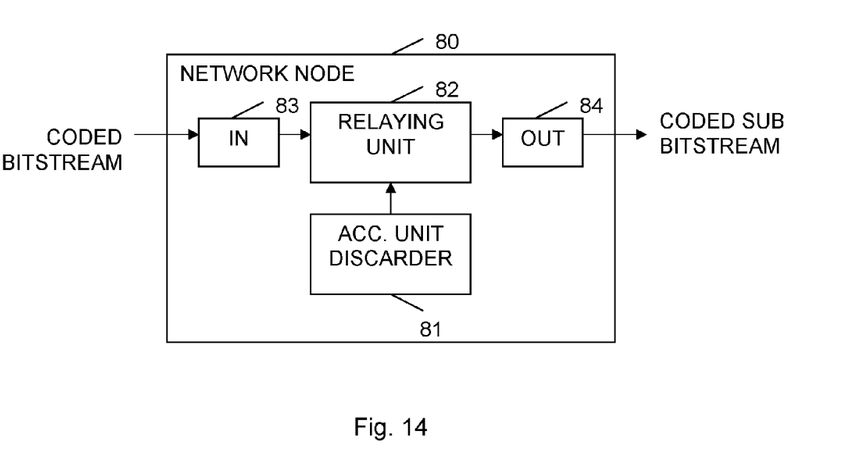
FIG. 14 is a schematic block diagram of a network node according to an embodiment.

FIG. 14 is a schematic block diagram of an embodiment of a network node 80. The network node 80 can be any device or unit that is arranged in or connected to a communication network, including mobile or cellular networks, in which coded bitstreams are communicated between a transmitter or encoder and a receiver or decoder. The network node 80 could for instance represent a base station, also denoted base radio station or node-B in the art. Alternatively, the network node 80 could be a device implemented in or connected (wired or wirelessly) to such a base station. The network node 80 could, for instance, form part of or constitute a media processing device implemented in the communication network.

The network node 80 generally comprises an access unit discarder 81, also denoted access unit discarding unit, means or module. The access unit discarder 81 is configured to discard access units of a bitstream of multiple access units comprising a respective encoded picture of a video sequence. As previously mentioned herein, each picture of the video sequence has a respective layer identifier identifying a respective layer. The access unit discarder 81 is then configured to discard access units with layer identifier higher than a selected layer identifier X from the bitstream to form a sub-bitstream.

The value X of the selected layer identifier could be determined by the network node 80 itself, such as by a processor (not illustrated) of the network node 80 as previously described herein. Alternatively, the network node 80 receives a notification of this value X from a external unit in the communication network.

The network node 80 also comprises a relaying unit 82, also denoted access unit relayer or relaying means or module. The relaying unit 82 is configured to relay, to form an updated bitstream, access units of the bitstream with layer identifier higher than X starting from a layer switching point with a layer identifier equal to X or X+1 in the bitstream.

The access unit discarder 81 and the relaying unit 82 are operated for discarding the access units and relaying the access units, respectively, without any need for checking the sub-bitstream and the updated bitstream for bitstream conformance.

In an embodiment, the network node 80 also comprises an input or input unit 83 that is configured to receive the coded bitstream with its access units. This input unit 83 may optionally also receive a notification of the selected value X for the layer identifier. A corresponding optional output or output unit 84 is preferably arranged in the network node 80 to output the coded sub-bitstream and the updated bitstream.

If each picture of the video sequence has a respective temporal identifier and the layer switching point is a TLA picture to which it is possible to perform a temporal layer switching then the relaying unit 82 is preferably configured to relay, to form the updated bitstream, the access units with temporal identifier higher than X starting from the TLA picture with a temporal identifier equal to X+1 in the bitstream.

If the layer switching point is instead a TLA picture from which it is possible to perform a temporal layer switching then the relaying unit 82 is preferably configured to relay, to form the updated bitstream, the access units with temporal identifier higher than X starting from the TLA picture with a temporal identifier equal to X in the bitstream.

Thus, an aspect of the embodiments relates to a network node 80 for bitstream extraction. The network node 80 can start discarding access units with temporal_id higher than X from a relayed bitstream at any point in time. The network node 80 can then start relaying access units with temporal_id higher than X at any TLA picture with temporal_id equal to X+1 or equal to X.

In a particular embodiment the network node 80 is configured to declare that the formed sub-bitstream and the updated bitstream are conforming bitstreams and where this declaration is performed without checking the sub-bitstream and the updated bitstream for bitstream conformance.

The network node 80 of FIG. 14 with its including units 81-84 could be implemented in hardware. There are numerous variants of circuitry elements that can be used and combined to achieve the functions of the units 81-84 of the network node 80. Such variants are encompassed by the embodiments. Particular examples of hardware implementation of the network node 80 are implementation in DSP hardware and integrated circuit technology, including both general-purpose electronic circuitry and application-specific circuitry.

The network node 80 can also be implemented by means of a processor and a memory. Thus, in an embodiment the network node 80 is implemented e.g. by one or more of a processor and adequate software with suitable storage or memory therefore, a PLD or other electronic component(s).

The embodiments can be applied to different video codecs and different types of extensions including, but not limited to, multi-view video codecs and scalable video codecs. For such extension the temporal layers can be replaced by other layers including, but not limited to, spatial layers, quality layers, dependency layers or different views. A switching point would for those cases be a spatial layer switching point, a quality layer switching point, a dependency layer switching point and a view switching point.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Annex A

The present Annex A lists the ten conditions specified for HEVC in order to achieve bitstream conformance. In order to a bitstream of coded data to be regarded as meeting the requirement of bitstream conformance all of the following conditions should be fulfilled.

1. For each access unit n, with n>0, associated with a buffering period Supplemental Enhancement Information (SEI) message, with $\Delta t_{g,90}(n)$ specified by $$\Delta t_{g,90}(n) = 90000 \times (t_{r,n}(n) - t_{af}(n-1))$$

the value of InitCpbRemovalDelay[SchedSelIdx] shall be constrained as follows.

If cbr_flag[SchedSelIdx] is equal to 0, $$\text{InitCpbRemovalDelay[SchedSelIdx]} \leq \text{Ceil}(\Delta t_{g,90}(n))$$

Otherwise (cbr_flag[SchedSelIdx] is equal to 1), $$\text{Floor}(\Delta t_{g,90}(n)) \leq \text{InitCpbRemovalDelay[SchedSelIdx]} \leq \text{Ceil}(\Delta t_{g,90}(n))$$

The exact number of bits in the Coded Picture Buffer (CPB) at the removal time of each picture may depend on which buffering period SEI message is selected to initialize the Hypothetical Reference Decoder (HRD). Encoders must take this into account to ensure that all specified constraints must be obeyed regardless of which buffering period SEI message is selected to initialize the HRD, as the HRD may be initialized at any one of the buffering period SEI messages.

CPB is a first-in first-out buffer containing access units in decoding order specified in the HRD. The HRD is a hypothetical decoder model that specifies constraints on the variability of conforming NAL unit streams or conforming byte streams that an encoding process may produce.

2. A CPB overflow is specified as the condition in which the total number of bits in the CPB is larger than the CPB size. The CPB shall never overflow.

3. A CPB underflow is specified as the condition in which the nominal CPB removal time of decoding unit m $t_{r,n}(m)$ is less than the final CPB arrival time of decoding unit m $t_{af}(m)$ for any value of m. When low_delay_hrd_flag is equal to 0, the CPB shall never underflow.

4. When low_delay_hrd_flag is equal to 1, a CPB underflow may occur at decoding unit m. In this case, the final CPB arrival time of access unit n containing decoding unit m $t_{af}(n)$ shall be later than the nominal CPB removal time of access unit n containing decoding unit m $t_{r,n}(n)$.

5. The nominal removal times of pictures from the CPB (starting from the second picture in decoding order), shall satisfy the constraints on $t_{r,n}(n)$ and $t_r(n)$ expressed in sub-clauses A.4.1—General tier and level limits and A.4.2—Profile-specific level limits for the Main and Main 10 profiles of the HEVC specification.

6. After the decoding process for reference picture set as specified in subclause 8.3.2—Decoding process for reference picture set of the HEVC specification has been invoked, the number of decoded pictures in the Decoded Picture Buffer (DPB), including all pictures marked as "used for reference" and all pictures n that have PicOutputFlag equal to 1 and $t_r(n) < t_r(\text{currPic})$ and $t_{o,dpb}(n) \geq tr(\text{currPic})$, where currPic is the current picture, but not including the current picture, with TemporalId lower than or equal to the TemporalId of the current picture, shall be less than or equal to Min(0, sps_max_dec_pic_buffering[TemporalId]−1).

The DPB is a buffer holding decoded pictures for reference, output reordering, or output delay specified for the HRD.

7. All reference pictures shall be present in the DPB when needed for prediction. Each picture shall be present in the DPB at its DPB output time unless it is removed from the DPB before its output time by one of the processes specified in subclause C.3—Operation of the decoded picture buffer (DPB) of the HEVC specification.

8. The value of maxPicOrderCnt−minPicOrderCnt shall be less than MaxPicOrderCntLsb/2.

9. The value of $\Delta t_{o,dpb}(n) = t_{o,dpb}(n_n) - t_{o,dpb}(n)$, which is the difference between the output time of a picture and that of the first picture following it in output order and having pic_output_flag equal to 1, shall satisfy the constraint expressed in subclause General tier and level limits of the HEVC specification for the profile, tier and level specified in the bitstream using the decoding process specified in clauses 2—Normative references; 3—Definitions; 4—Abbreviations; 5—Conventions; 6—Source, coded, decoded and output data formats, scanning processes, and neighboring relationships; 7—Syntax and semantics; 8—Decoding process and 9—Parsing process of the HEVC specification.

10. When sub_pic_cpbparams_present_flag is 1 the following relationship shall apply $$\text{cpb\_removal\_delay} \times t_c == t_{c\_sub} \times \sum_{i=0}^{num\_decoding\_units\_minus1} du\_cpb\_removal\_delay[i]$$

Annex B

The present Annex B lists the seven conditions specified for H.264/AVC in order to achieve bitstream conformance. In order to a bitstream of coded data to be regarded as meeting the requirement of bitstream conformance all of the following conditions should be fulfilled.

1. For each access unit n, with n>0, associated with a buffering period SEI message, with $\Delta t_{g,90}(n)$ specified by $$\Delta t_{g,90}(n)=90000\times(t_{r,n}(n)-t_{af}(n-1))$$

the value of initial_cpb_removal_delay[SchedSelIdx] shall be constrained as follows.

If cbr_flag[SchedSelIdx] is equal to 0, $$\text{initial\_cpb\_removal\_delay[SchedSelIdx]} \leq \text{Ceil}(\Delta t_{g,90}(n))$$

Otherwise (cbr_flag[SchedSelIdx] is equal to 1), $$\text{Floor}(\Delta t_{g,90}(n)) \leq \text{initial\_cpb\_removal\_delay[SchedSelIdx]} \leq \text{Ceil}(\Delta t_{g,90}(n))$$

The exact number of bits in the CPB at the removal time of each picture may depend on which buffering period SEI message is selected to initialize the HRD. Encoders must take this into account to ensure that all specified constraints must be obeyed regardless of which buffering period SEI message is selected to initialize the HRD, as the HRD may be initialized at any one of the buffering period SEI messages.

2. A CPB overflow is specified as the condition in which the total number of bits in the CPB is larger than the CPB size. The CPB shall never overflow.

3. A CPB underflow is specified as the condition in which $t_{r,n}(n)$ is less than $t_{af}(n)$. When low_delay_hrd_flag is equal to 0, the CPB shall never underflow.

4. The nominal removal times of pictures from the CPB (starting from the second picture in decoding order), shall satisfy the constraints on $t_{r,n}(n)$ and $t_r(n)$ expressed in subclauses A.3.1—Level limits common to the Baseline, Constrained Baseline, Main, and Extended profiles; A.3.2—Level limits common to the High, High 10, High 4:2:2, High 4:4:4 Predictive, High 10 Intra, High 4:2:2 Intra, High 4:4:4 Intra, and CAVLC 4:4:4 Intra profiles and A.3.3—Profile-specific level limits of ISO/IEC 14496-10 Information technology—Coding of audio-visual objects, Part 10: Advanced Video Coding (denoted H.264/AVC specification herein) for the profile and level specified in the bitstream when decoding a coded video sequence conforming to one or more of the profiles specified in Annex A—Profiles and levels of the H.264/AVC specification using the decoding process specified in clauses 2—Normative references; 3—Definitions; 4—Abbreviations; 5—Conventions; 6—Source, coded, decoded and output data formats, scanning processes, and neighboring relationships; 7—Syntax and semantics; 8—Decoding process and 9—Parsing process of the H.264/AVC specification and they shall satisfy the constraints on $t_{r,n}(n)$ and $t_r(n)$ expressed in subclauses G.10.2.1—Level limits common to Scalable Baseline, Scalable High, and Scalable High Intra profiles and G.10.2.1—Profile specific level limits of the H.264/AVC specification for profile and level specified in the bitstream when decoding a coded video sequence conforming to one or more of the profiles specified in Annex G—Scalable video coding of the H.264/AVC specification using the decoding process specified in this Annex G, and they shall satisfy the constrains on $t_{r,n}(n)$ and $t_r(n)$ expressed in subclause H.10.2—Levels for the profile and level specified in the bitstream when decoding a coded video sequence conforming to one or more of the profiles specified in Annex H—Multiview video coding of the H.264/AVC specification using the decoding process specified in this Annex H.

5. Immediately after any decoded picture is added to the DPB, the fullness of the DPB shall be less than or equal to the DPB size as constrained by Annexes A—Profiles and levels; D—Supplemental enhancement information and E—Video usability information of the H.264/AVC specification and subclauses G.10—Profiles and levels; G.13—Supplemental enhancement information; G.14—Video usability information; H.10—Profiles and levels; H.13—MVC SEI messages and H.14—Video usability information of the H.264/AVC specification for the profile and level specified in the bitstream.

6. All reference pictures shall be present in the DPB when needed for prediction. Each picture shall be present in the DPB at its DPB output time unless it is not stored in the DPB at all, or is removed from the DPB before its output time by one of the processes specified in subclause C.2—Operation of the decoded picture buffer (DPB) of the H.264/AVC specification.

7. The value of $\Delta t_{o,dpb}(n)=t_{o,dpb}(n_n)-t_{o,dpb}(n)$, which is the difference between the output time of a picture and that of the first picture following it in output order and having OutputFlag equal to 1, shall satisfy the constraint expressed in subclause A.3.1—Level limits common to the Baseline, Constrained Baseline, Main, and Extended profiles of the H.264/AVC specification for the profile, tier and level specified in the bitstream when decoding a coded video sequence conforming to one of more of the profiles specified in Annex A of the H.264/AVC specification using the decoding process specified in clauses 2-9 of the H.264/AVC specification, and it shall satisfy the constraint expressed in subclause G.10.2.1 of the H.264/AVC specification for profile and level specified in the bitstream when decoding a coded video sequence conforming to one or more of the profiles specified in Annex G of the H.264/AVC specification using the decoding process specified in this Annex G, and it shall satisfy the constraints expressed in subclause H.10.2 of the H.264/AVC specification for the profile and level specified in the bitstream when decoding a coded video sequence conforming to one or more of the profiles specified in Annex H of the H.264/AVC specification using the decoding process specified in this Annex H.

The invention claimed is:

1. A sub-bitstream extraction method applicable to a bitstream of multiple access units comprising a respective encoded picture of a video sequence, said method comprising:

identifying an access unit among said bitstream comprising said multiple access units; and discarding said access unit and all access units in said bitstream that can depend on said access unit to form a sub-bitstream having no access unit that can depend on said access unit, wherein each picture of said video sequence has a respective layer identifier identifying a respective layer, discarding said access unit comprises discarding said access unit and all access units in said bitstream having layer identifier higher than or equal to said layer identifier of said access unit and following said access unit according to a decoding order of said bitstream but preceding, according to a defined order of said bitstream, any next layer switching point having a layer identifier lower than or equal to said layer identifier of said access unit.

2. The method according to claim 1, wherein discarding said access unit comprises:

discarding said access unit from said bitstream; and discarding all access units in said bitstream having layer identifier higher than or equal to said layer identifier of said access unit and following said access unit according to said decoding order but preceding, according to said defined order, a next layer switching point having a layer identifier lower than or equal to said layer identifier of said access unit if said bitstream comprises a next layer switching point having a layer identifier lower than or equal to said layer identifier of said access unit and following said access unit according to said defined order; or discarding all access units in said bitstream having layer identifier higher than or equal to said layer identifier of said access unit and following said access unit according to said decoding order if said bitstream does not comprise any next layer switching point having a layer identifier lower than or equal to said layer identifier of said access unit and following said access unit according to said defined order.

3. The method according to claim 1, wherein discarding said access unit comprises discarding said access unit and all access units in said bitstream having layer identifier higher than or equal to said layer identifier of said access unit and following said access unit according to a decoding order of said bitstream but preceding, according to said decoding order of said bitstream, any next layer switching point having a layer identifier lower than or equal to said layer identifier of said access unit.

4. The method according to claim 1, wherein discarding said access unit comprises discarding said access unit and all access units in said bitstream having layer identifier higher than or equal to said layer identifier of said access unit and following said access unit according to a decoding order of said bitstream but preceding, according to an output order of said bitstream, any next layer switching point having a layer identifier lower than or equal to said layer identifier of said access unit.

5. The method according to claim 1, wherein:
each picture of said video sequence has a respective temporal identifier identifying a respective temporal layer, and
said layer switching point is a temporal layer switching point selected from a group consisting of a temporal layer access, TLA, picture and an instantaneous decoding refresh, IDR, picture.

6. The method according to claim 1, wherein discarding said access unit comprises:
marking said access unit as to be removed from said bitstream;
marking said all access units in said bitstream that can depend on said access unit as to be removed from said bitstream; and
discarding all access units of said bitstream marked as to be removed from said bitstream.

7. The method according to claim 1, wherein discarding said access unit and said all access units is performed without decoding said access unit.

8. A sub-bitstream extracting device comprising:
an access unit identifier configured to identify an access unit among a bitstream of multiple access units comprising a respective encoded picture of a video sequence; and
an access unit discarder configured to discard said access unit and all access units in said bitstream that can depend on said access unit to form a sub-bitstream having no access unit that can depend on said access unit,
wherein each picture of said video sequence has a respective layer identifier identifying a respective layer, said access unit discarder is configured to discard said access unit and all access units in said bitstream having layer identifier higher than or equal to said layer identifier of said access unit and following said access unit according to a decoding order of said bitstream but preceding, according to a defined order of said bitstream, any next layer switching point having a layer identifier lower than or equal to said layer identifier of said access unit.

9. The device according to claim 8, wherein said access unit discarder is configured to i) discard said access unit from said bitstream, and iia) discard all access units in said bitstream having layer identifier higher, than or equal to said layer identifier of said access unit and following said access unit according to said decoding order but preceding, according to said defined order, a next layer switching point having a layer identifier lower than or equal to said layer identifier of said access unit if said bitstream comprises a next layer switching point having a layer identifier lower than or equal to said layer identifier of said access unit and following said access unit according to said defined order, or iib) discard all access units in said bitstream having layer identifier higher than or equal to said layer identifier of said access unit and following said access unit according to said decoding order if said bitstream does not comprise any next layer switching point having a layer identifier lower than or equal to said layer identifier of said access unit and following said access unit according to said defined order.

10. The device according to claim 8, wherein said access unit discarder is configured to discard said access unit and all access units in said bitstream having layer identifier higher than or equal to said layer identifier of said access unit and following said access unit according to a decoding order of said bitstream but preceding, according to said decoding order of said bitstream, any next layer switching point having a layer identifier lower than or equal to said layer identifier of said access unit.

11. The device according to claim 8, wherein said access unit discarder is configured to discard said access unit and all access units in said bitstream having layer identifier higher than or equal to said layer identifier of said access unit and following said access unit according to a decoding order of said bitstream but preceding, according to an output order of said bitstream, any next layer switching point having a layer identifier lower than or equal to said layer identifier of said access unit.

12. The device according to claim 8, further comprising:
a marking unit configured to i) mark said access unit as to be removed from said bitstream, and ii) mark said all access units in said bitstream that can depend on said access unit as to be removed from said bitstream, wherein
said access unit discarder is configured to discard all access units of said bitstream marked as to be removed from said bitstream.

13. The device according to claim 8, wherein said access unit discarder is configured to discard said access unit and said all access units without decoding said access unit.

14. A decoder comprising a sub-bitstream extracting device according to claim 8.

15. A mobile device comprising a decoder according to claim 14.

16. An encoder comprising a sub-bitstream extracting device according to claim 8.

17. A mobile device comprising an encoder according to claim 16.

* * * * *